United States Patent [19]

Ullakko et al.

[11] 4,158,110
[45] Jun. 12, 1979

[54] TONE SELECTIVE KEY TELEPHONE INTERCOM SYSTEM INCLUDING DIGITAL TONE DETECTOR

[75] Inventors: Richard J. Ullakko, Kirkland; Victor M. De Pinto, Bellevue, both of Wash.

[73] Assignee: Tone Commander Systems, Inc., Redmond, Wash.

[21] Appl. No.: 827,630

[22] Filed: Aug. 25, 1977

[51] Int. Cl.² .................... H04M 1/72; H04M 1/50
[52] U.S. Cl. ............................ 179/99 R; 179/84 VF
[58] Field of Search ............... 179/18 AD, 84 VF, 99, 179/37, 16 EC, 18 HB

[56] References Cited

U.S. PATENT DOCUMENTS

| | | | |
|---|---|---|---|
| 3,609,249 | 9/1971 | Pinede | 179/99 |
| 3,739,100 | 6/1973 | Cartwright | 179/18 AD |
| 3,790,720 | 2/1974 | Schartmann | 179/84 VF |
| 3,917,912 | 11/1975 | Niwa | 179/84 VF |
| 3,935,395 | 1/1976 | Ball et al. | 179/84 VF |
| 3,941,944 | 3/1976 | McIntosh | 179/99 |
| 4,044,206 | 8/1977 | Champan et al. | 179/84 VF |

Primary Examiner—Kathleen H. Claffy
Assistant Examiner—Randall P. Myers
Attorney, Agent, or Firm—Dowrey & Cross

[57] ABSTRACT

The system receives subscriber station address information in the form of frequency coded tone signals transmitted from a calling station along a common intercom circuit, and selectively accesses a called subscriber station having a corresponding station address in order to produce a call indication ring-out thereat. The system is comprised of decoder circuitry including a digital multi-frequency tone detector for receiving and decoding station address information transmitted from a calling station, and access circuitry operatively associated with the tone detector for routing an appropriate call indication signal to the called station. Signals which appear at the output of the tone detector are delivered to the access circuitry which, in turn, initiates the call indication sequence and routes additional signals back to the tone detector for controlling it during call indication. The system is suitable for use with 10, 19, 36 or varying numbers of subscriber stations and may include, for applications having more than 10 subscriber stations, appropriate transfer and associated output control circuitry for double digit operation.

24 Claims, 5 Drawing Figures

TONE SELECTIVE KEY TELEPHONE INTERCOM SYSTEM INCLUDING DIGITAL TONE DETECTOR

BACKGROUND OF THE INVENTION

This invention relates to key telephone intercom systems and, more particularly, to tone selective or push button key telephone intercom systems.

Key telephone systems of this type commonly utilize voice frequency coded digit transmission schemes based upon dual-tone multi-frequency (DTMF) codes in which a tone pair representing a particular decimal digit station address or portion of a station address is "dialed" or generated at the calling station by depressing the appropriate key pad push button with the calling station telephone set off hook and keyed to an intercom circuit. For single digit codes, only one push button need be depressed; for double digit codes, two push buttons (or the same push button) are depressed in sequence, and so on. Each push button depression produces a tone burst containing DTMF coded signals which are transmitted over the common intercom circuit or channel to a receiver which decodes and identifies the decimal digit or station address represented by the tone signals with respect to an audio tone matrix. According to the so-called 4×4 audio tone matrix, each digit is represented by one tone from a high frequency tone group, and one tone from a low frequency tone group. The concurrence of a selected pair of tones, one from each group, represents a decimal digit. The DTMF code is composed of nonharmonically related frequencies in order to protect the system against false-keying by stray signals and voice-generated tones.

Prior tone selective key telephone systems accomplish tone detection by analogue circuitry which, in many practical tone selective key telephone applications, is less than satisfactory from the standpoints of manufacturing costs, performance, size and/or reliability. More specifically, the LC resonant circuits and/or phase lock loops which are most commonly utilized in prior analogue tone detectors must be operated at unacceptably low response times in order to obtain sufficient selectivity for guarding against digit simulation by speech or noise introduced at the calling station. These analogue detectors tend to be excessively complex, difficult to miniaturize, and costly to manufacture. Furthermore, since the tone signals are processed entirely in the analogue form, the maintenance and adjustment of these systems tend to be difficult.

Digital multi-frequency or DTMF tone detection offers economy, performance, size and reliability benefits which appear capable of overcoming or substantially mitigating these and other problems associated with analogue detectors. Examples of prior digital multi-frequency tone decoders are disclosed in U.S. Pat. Nos. 3,537,001, 3,760,269, 3,790,720, and 3,917,912.

SUMMARY OF THE INVENTION

This invention provides a tone selective key telephone system which implements tone detection by a multi-frequency digital tone detector. This detector presents appropriate output signals which are utilized by access circuitry operatively associated therewith for effecting a desired call indication. The access circuitry further controls operation of the tone detector during call indication.

According to one preferred embodiment of the invention, appropriate band separation filters separate DTMF coded tone signals transmitted from a calling station into their component dual tones, one tone from a high frequency tone group, the other from a low frequency tone group. The separated tone signals are then squared and delivered to respective inputs of a digital multi-frequency tone detector. The tone detector includes a source of clock pulses of a frequency substantially greater than the high frequency tone signal, together with appropriate digital counting circuitry for identifying the frequencies of the high and low frequency tone signals within predetermined band widths by counting the clock pulses during successive cycles of each tone signal. The tone detector presents a data signal representing a decoded decimal digit or station address based upon the high and low frequencies identified, together with a strobe signal indicative that the data signal corresponds to a valid decimal digit or station address. A level detector circuit initializes the tone detector following a tone detection sequence on the basis of the occurrence of silence represented by the presentation of an incoming high frequency tone signal below a predetermined level.

In applications involving more than ten stations, the system is responsive to a double digit code in which two tone signals are received and decoded—the first received tone signal corresponding to a so-called "transfer digit". Ring-out or call indication is effected after receipt and decoding of the second tone signal, unless, of course, the first tone signal corresponds to a non-transfer digit. In the latter event, ring-out takes place after receipt and decoding of the first tone signal on the basis of a single digit code. To this end, the system includes transfer relays for selectively routing a call indication signal to one group of stations selected from within one or more station groups, together with appropriate digit relays operatively associated with the tone detector data output for selectively routing the call indication signal to a called station within the group selected by the transfer relays. Transfer digit logic circuitry receives the data signal from the tone detector and determines whether it does or does not correspond to a transfer digit and, on the basis of this information, alternatively sets a transfer enable flip flop or a ring enable flip flop, as the case may be. These flip flops are triggerred by the strobe signal in order to operate respectively associated transfer control circuitry and ring-out or call indication control circuitry. During ring-out, the ring enable flip flop additionally applies appropriate binary control signals to the tone detector for causing it to hold its data output and provide an external clock signal during ring-out. The ring-out control circuitry includes a ring-out or call indication timer composed of a multistage counter driven by the external clock signal provided by the tone detector. This timer times the duration of the call indication and, upon completion of ring-out, causes the digit relays and then the transfer relays to be disenabled, while initializing the ring enable and transfer enable flip flops and related control circuitry. A hook sense detector alternately causes the ring enable and transfer enable flip flops to be disenabled when all stations assume on-hook status. In applications of this type (i.e. more than 10 stations), the digit relays could be disenabled before the transfer relays in order to prevent false ring-outs. According to further principles of the invention, the system may be adapted for 10 station service application by utilizing five 1-of-5 digit relays, together with an odd-even relay and associated logic circuitry. To prevent false ring-outs in the latter application, the odd-even relay and then the 1-of-5 relays are enabled in sequence to commence ring-out, but the 1-of-5 relays and then the odd-even relay are disenabled in reverse sequence at completion of ring-out.

Thus, it will be appreciated from the foregoing summary that this invention overcomes or substantially mitigates problems heretofore associated with analogue tone selective key telephone communication systems by implementing tone detection digitally. This invention therefore affords the benefits associated with digital and related integrated circuit or large scale integrated (LSI) circuit technology for tone selective key telephone application. That is, it provides highly reliable long-term performance, with fabrication, operational and servicing economies heretofore unparalleled by prior analogue tone selective key telephone communication systems. While preferably a digital multi-frequency tone detector such as that described hereinabove is utilized in this invention, it will be recognized that other digital multi-frequency tone detectors which provide generally similar input and output signal functions may be used in this invention, if desired. Accordingly, the internal logic and control functions of the digital tone detector utilized may vary, depending upon application, production economies and other factors, provided that that detector affords input and output signal functions which are compatable with the decoder and access circuitry of this invention.

These and other features, objects and advantages of the present invention will become apparent in the detailed description and claims to follow taken in conjunction with the accompanying drawings in which like parts bear like reference numerals.

DETAILED DESCRIPTION OF THE DRAWINGS

Figure 1:
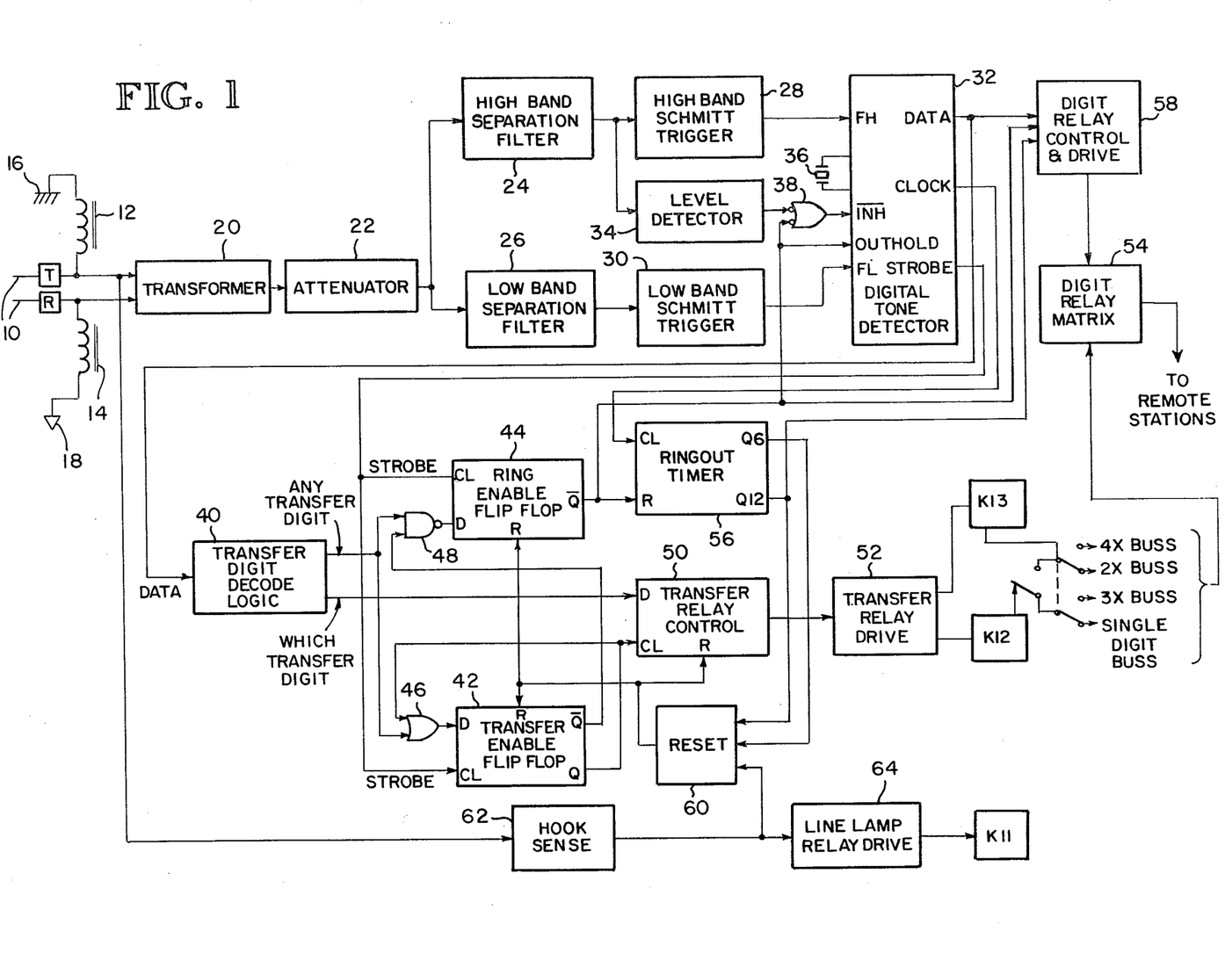
FIG. 1 is a schematic block diagram of a tone selective key telephone intercom system according to this invention.

The tone selective key telephone intercom system of this invention is illustrated in schematic block diagram form in FIG. 1. Except as indicated hereinafter, the illustrated electrical circuits which make up the FIG. 1 system are of conventional design and may assume any of several forms, provided they perform the functions hereinafter described. The FIG. 1 system is connected at tip and ring terminals T and R to a common intercom circuit (generally referenced by numeral 10) which electrically connects all subscriber telephone stations served by the FIG. 1 system. All stations having intercom service, therefore, are connected by generally similar terminals to the common intercom circuit for talking and tone signalling purposes so that the intercom circuit can be used by two, three or more stations at the same time, as the case may be. Each subscriber station includes a conventional push-button telephone having feed coils 12 and 14 connected between ground 16 and negative talking battery 18, along with an appropriate call signalling means, usually a ring-out device. The FIG. 1 circuitry provides selective access from one station (sometimes referred to herein as the "calling station") to the call signalling means associated with another station (sometimes referred to herein as the "called" station). In order to initiate such selective accessing, the calling station is placed in its off-hook condition while the remaining subscriber stations are in their on-hook conditions, and then the appropriate digit or digits corresponding to the address of the called station are "dialed" by depression of the appropriate key pad push button or buttons. The FIG. 1 system receives the resultant station address information in the form of frequency coded tone signals which are routed from the calling station via circuit 10 and, in response to such information, selectively accesses and actuates the ring-out device associated with the called station, as will be described hereinafter.

Figure 2:
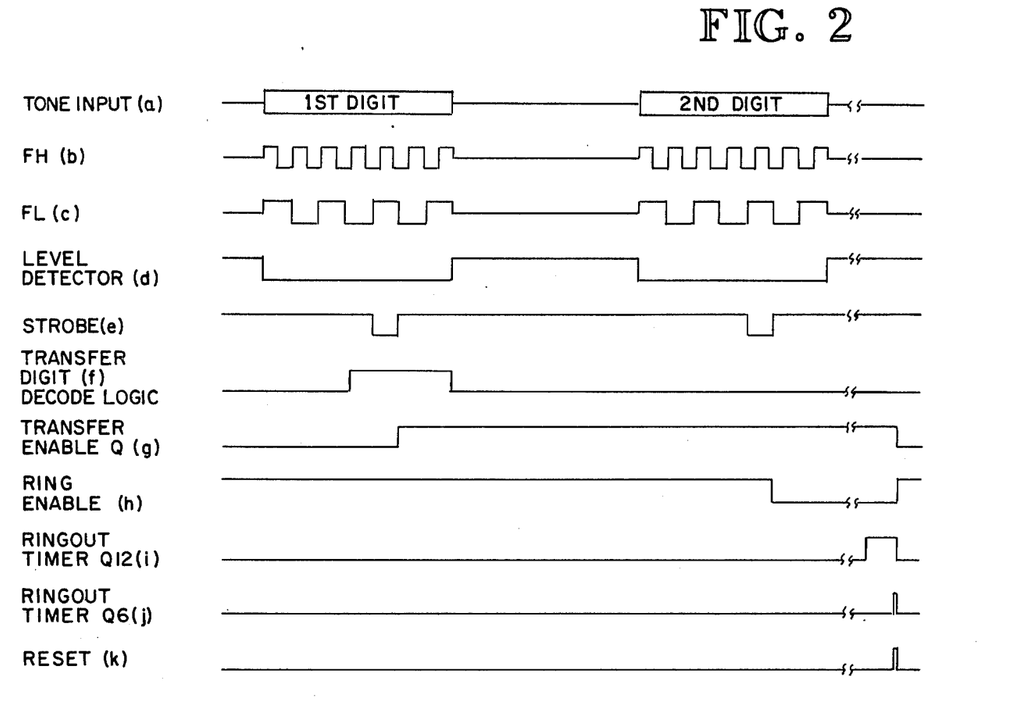
FIG. 2 is a timing diagram depicting operation of the FIG. 1 system.

The FIG. 1 tone selective key telephone system will now be described in further detail with specific reference to FIGS. 1 and 2. Frequency coded tone signals which appear at the tip and ring terminals are transformer coupled by transformer 20 to an attenuator circuit 22. The output of this circuit is delivered to a front-end band-split filter limiter circuit made up of respective high and low band separation filters 24, 26 and Schmitt triggers 28, 30. This circuit separates each incoming tone signal into its two component nonharmonically related DTMF frequencies, one frequency within a high frequency tone group composed of frequencies 1209, 1336 and 1447 Hz, and the other within a low frequency tone group composed of frequencies 697, 770, 852 and 941 Hz. (In the example, frequency 1633 Hz is not used). The tone separation process is accomplished by the high and low band separation filters 24, 26. The signals which respectively appear at the outputs of these filters appear as sine waves. These signals are transformed into square wave signals and amplitude limited by the high band and low band Schmitt triggers 28, 30. The signals which appear at the outputs of the Schmitt triggers thus constitute square wave signals of frequencies which fall within the high and low group tone frequencies set forth above. (These signals are illustrated in FIG. 2, curves b and c, in which the high frequency signals is designated FH and the low frequency signal is designated FL). These square wave signals are respectively routed to the FH and FL inputs of a digital tone detector 32, to be described presently. In the illustrated example, the high and low band separation filters are made up of respective three cascaded, two-pole, high pass sections which provide appropriate response drops and midband gains without attenuation.

The FIG. 1 digital tone detector accepts the group-filtered and squared DTMF frequencies which appear at inputs FH and FL and converts them to appropriate output data in a predetermined time period. Out of tolerance frequencies are rejected, as are the first few cycles of each incoming tone signal in order to prevent errors in detection due to transients from the push-button telephone at the calling station. The incoming tone signal is then analyzed several times by correlation circuitry to determine whether it is comprised of a valid tone pair. Once the incoming signal is accepted as valid, the detector produces a negative going strobe pulse (See FIG. 2, curve e). Once this correlation process is accomplished and an incoming tone signal is accepted as valid, the detector will ignore any further change in incoming tone frequency until silence is detected, or until either the high group or low group incoming tone signal disappears for more than a predetermined time period. At the end of silence (or when sound is beginning), the detector is reset and will be ready to accept and detect another incoming tone signal representative of another decimal digit constituting appropriate station address information. In the example, the detector will not repeat a given detection routine until end of silence. Appropriate silence detection which initializes this reset function is provided by a level detector circuit 34 which will be described in further detail hereinafter.

In the illustrated example, the digital tone detector measures the frequency of the incoming tone signals by counting internally generated clock pulses provided by oscillator 36 during respective time periods corresponding to the period of selected successive square wave cycles of both signals presented at its FH and FL inputs. That is, the detector measures the time period between alternate zero crossings of selected successive square wave cycles of both signals. The clock pulses generated by oscillator 36 therefore are of a predetermined frequency substantially greater than the maximum tone frequency of incoming tone signals contained within the high frequency tone group. Internal discriminating circuitry counts the number of clock pulses within each cycle and determines if the incoming tone signal is within a certain frequency range based upon established clock count bands which correspond to the recognition band width limits of the DTMF tones to be detected. Digital correlation circuits in the form of individual up-down counters respectively associated with the DTMF tone frequencies distinquish valid tone pairs from noise, speech or other voice frequency signals which do not correspond to the desired DTMF frequencies. These counters count the number of valid detections accomplished by the detector by incrementing the counter associated with the detected frequency and simultaneously decrementing all remaining counters. When a particular up-down counter reaches a predetermined count, the detector thereupon determines that a valid detection has taken place. At that time, the data and strobe output signals appear at the detector outputs. If this condition does not occur before an expiration of an internally generated timing function, data will appear at the detector data output; but the strobe pulse does not appear. In the example, the detector includes seven data outputs which are normally high or logic 1 and which drop to a logic 0 state to assert the data. The various input and output signals indicated in FIG. 1 and the relationship to the remaining illustrated circuitry are described hereinafter in additional detail. One digital multi-frequency tone detector suitable for use in this invention is the CRC 8030 telephone DTMF Receiver, Rockwell International, Collins Hybrid Microelectronics.

The level detector circuit illustrated in FIG. 1 and referenced by number 34 establishes a low or logic 0 signal at one input of a gate 38 of the logic NAND type as long as the amplitude of the signals which appear at the output of the high band separation filter exceeds a predetermined threshold level. This condition, of course, takes place during receipt of each incoming tone signal, as shown (FIG. 2, curve d). A logic 1 signal thereupon appears at the output of gate 38 and is routed to the not inhibit (INH) input of the tone detector. The detector is thus enabled for detecting any DTMF tones which appear at its FH and FL inputs. The level detector thus initializes tone detector on the basis of silence as represented by the absence of any signal above the predetermined threshold level. The level detector further determines when silence has ended (or sound is beginning) in order to enable the detector in preparation for a detection sequence. In the example, the level detector is comprised of a precision rectifier which generates a DC voltage proportional to the peak of the output signal from the high band separation filter, together with a comparater which yields the desired output signal whenever the rectifier voltage falls below a predetermined reference voltage.

Figure 3:
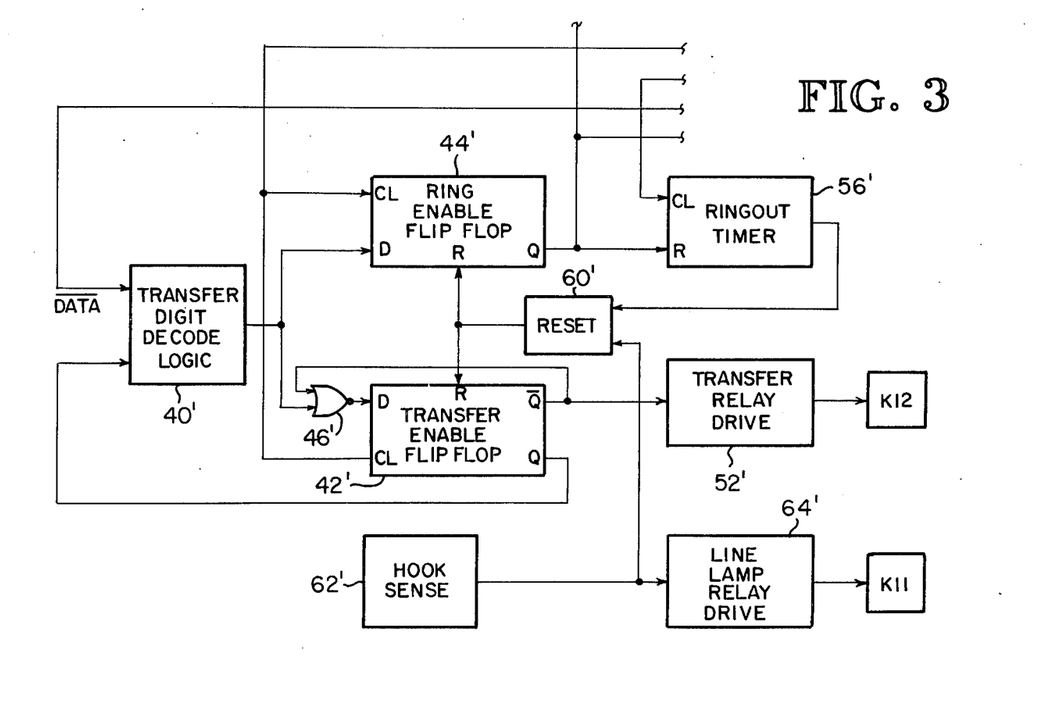
FIG. 3 is a fragmentary schematic block diagram generally similar to FIG. 1 of a modified portion of the FIG. 1 system.

The data signal which appears at the output of the tone detector is routed to the input of a transfer digit decode logic circuit 40 composed of suitable logic gates which provide a binary output signal indicative of whether the data signal represents a transfer digit or a non-transfer digit. As illustrated in FIG. 2, curve f, this binary output signal corresponds to a logic 1 in the event the first digit is a transfer digit. The FIG. 2, curve f, binary output from circuit 40 is routed simultaneously to a transfer enable control and ring-out enable control made up of a transfer enable flip flop 42, a ring enable flip flop 44, and logic gates 46, 48 respectively associated with the data inputs thereof. The ring enable flip flop and the transfer enable flip flop are set in alternate sequence depending upon whether the data signal input to the transfer digit decode logic circuit corresponds to a non-transfer digit (ring enable flip flop set) or a transfer digit (transfer enable flip flop set). The transfer digit decode logic circuit additionally produces a second binary output signal indicative of which transfer digit was dialed. The latter is routed to the data input of a transfer relay control 50. In the illustrated FIG. 1 system, control 50 is made up of two flip flops which, when triggered in appropriate combinations, yield control signals respectively corresponding to three transfer digits. In other applications, of course, control 50 could include additional flip flops for identifying more than three transfer digits or, as illustrated in FIG. 3, control 50 could be eliminated in systems utilizing only one transfer digit.

If the data signal which first appears at the data output of detector 32 corresponds to a transfer digit, the FIG. 2, curve f, logic 1 output signal is routed by gate 46 to the data input of the transfer enable flip flop 42. The transfer enable flip flop therefore is now set. Control 50 is simultaneously set by the aforementioned second binary output signal from circuit 40 on the basis of which transfer digit was "dialed".

The strobe output signal which appears at the detector strobe output following determination by the detector that the incoming tone signal corresponds to a valid tone pair is routed to the clock inputs of the transfer enable and ring enable flip flops 42 and 44, as shown (FIG. 2). The now-set transfer enable flip flop is triggered by the trailing edge of the strobe pulse and routes a logic 1 clock signal (See FIG. 2, curve g) from its Q output to the clock input of control 50 which thereupon routes a control signal indicative of which transfer digit was dialed to a transfer relay drive 52. The signals which appear at the outputs of drive 52 selectively operate transfer relays K12 and K13 in appropriate combinations for individually accessing the four output buses illustrated. These buses are respectively connected to a digit relay matrix 54 made up of ten digit relays each including four outputs respectively associated with the four output buses. The Q output of flip flop 42 remains high until reset at the end of ring-out (See FIG. 2, curve g), thereby causing the transfer relays to remain closed until that time. This output additionally is routed back to its data input, as shown (FIG. 1). After all tone signals corresponding to the first digit have been received, the level detector 34 causes the tone detector 32 to be reset. The data signal now is removed from the transfer digit decode logic circuit, the output of which now returns to a logic 0 as depicted in FIG. 2, curve f.

The aforementioned decoding and tone detection process is now repeated with respect to the second digit "dialed" which, in this example, corresponds to a nontransfer digit. (Refer again to FIG. 2, curves a–d.). The logic 0 signal now present at the output of the transfer digit decode logic circuit 40 is delivered to gate 48 along with the $\overline{Q}$ output of the transfer enable flip flop 42. Gate 48 thereupon delivers a logic 1 signal to the data input of the ring enable flip flop 44. Flip flop 44 is not set. It is triggered by the trailing edge of the second strobe pulse which is produced following determination by the detector 32 that the second tone signal also corresponds to a valid tone pair. (The transfer enable flip flop 42 also receives this strobe pulse but its Q output remains high as depicted in FIG. 2, curve g). The ring enable flip flop 44 now generates a logic 0 signal (FIG. 2, curve h) which sets a ring out timer 56 made up of a multi-stage counter. (This counter is driven by the detector as will be described presently). As illustrated in FIG. 1, flip flop 44 further routes the FIG. 2, curve h, signal to a relay drive and control circuit 58 which, when thus operated, routes the detector data signal to the digit relay matrix 54 for operating a particular digit relay.

The FIG. 2, curve h, signal additionally is routed back to detector 32 for control purposes. This signal first is applied to the outhold input of the detector which causes the data signal to be latched at the detector data output. Consequently, the data signal will continue to be applied to the digit relay matrix and, hence, the designated digit relay will remain operated until the outhold signal is removed at the end of ring out, as will be described presently. The FIG. 2, curve h, signal is further routed to the second input of gate 38 so that the detector will remain enabled during ring-out, or until the ring enable flip flop is reset upon completion of ring-out, as will be described presently. This ensures the presence of the detector clock signal which appears at the illustrated detector clock output and which is routed to the clock input of the ring-out timer 56, as shown (FIG. 1). The clock frequency and the number of counter stages associated with timer 56 are selected to provide a predetermined ring-out time period. In the example, the timer 56 includes twelve stages.

At termination of ring-out, stage Q12 of timer 56 presents a logic 1 signal (FIG. 2, curve i) to the digit relay control and drive 58 which thereupon causes the digit relays to be disenabled. In the example, the transfer relays are disenabled a short time later in response to the simultaneous occurances of output signals at the Q12 and Q6 timer output stages (refer to FIG. 2, curves i and j). To this end, a reset circuit 60 receives the signals generated by stages Q12 and Q6 and, in response to such simultaneous occurances thereof, routes a reset pulse (FIG. 2, curve k) to the reset inputs R of flip flops 42, 44 and control 50. The transfer relays thus are now disenabled, and flip flops 42, 44 and control 50 are initialized in preparation for the next access sequence. The ring enable flip flop now removes the outhold and enable signals from the detector.

In the event the first digit "dialed" is a nontransfer digit, the transfer digit decode logic does not, of course, produce the FIG. 2, curve and binary logic signal. In this case, therefore, the ring enable flip flop 44 is set instead of the transfer enable flip flop 42. The ensuing strobe pulse is therefore routed to the clock input of flip flop 44 which thereupon effects the aforementioned ring-out sequence.

A hook sense detector 62 alternatively initializes the aforementioned flip flops 42, 44 and control 50 when all subscriber telephones associated with the intercom circuit 10 assume on-hook status. In response to this condition, the hook sense circuit routes an appropriate binary logic signal to the reset circuit 60 which, in response thereto, repeats the aforementioned reset sequence. The hook sense detector further delivers an additional binary logic signal to a line lamp relay drive circuit 64 which controls a line lamp relay K11. This relay initiates appropriate indications at all subscriber telephone sets for indicating that the intercom circuit 10 is in use.

As thus far described, the tone selective key telephone system of this invention provides key telephone service to selected numbers of subscriber stations. In the FIG. 1 system, key telephone service may be provided to a maximum of 36 stations, hence three transfer digits are used. As illustrated in FIG. 3, the key telephone system of this invention may provide intercom service to 19 subscriber stations, hence only one transfer digit is needed and the transfer circuitry may be simplified. Parts illustrated in FIG. 3 which correspond to parts already described herein with reference to FIG. 1 are not further described herein but are designated with the same reference numerals, primed.

The FIG. 3 system receives and decodes incoming DTMF signals as described hereinabove with reference to FIG. 1. It also selectively accesses the called station and effects ring-out in almost the same manner, except that the $\overline{Q}$ output of transfer enable flip flop 42′ is applied directly to the transfer relay drive, while its Q output is routed back to and disables the transfer digit decode logic 40′. In the example, the ring-out timer 56′ yields a single binary output signal which is routed to the reset circuit 60′ because, in most practical cases, the single transfer relay and digit relays tend to drop out at about the same time, although in some cases the timer counter stages could be used to provide the drop out delay described hereinabove.

Figure 4:
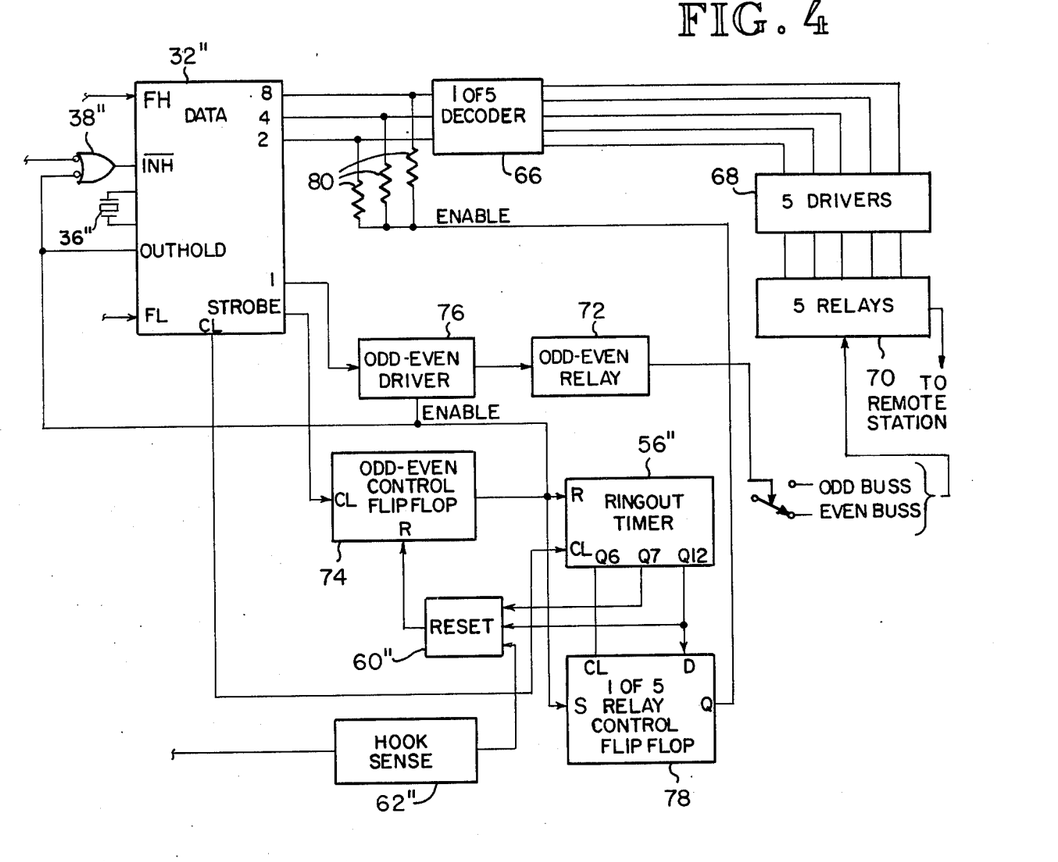
FIG. 4 is a fragmentary block diagram generally similar to FIG. 1 of a 10 station tone selective key telephone intercom system according to this invention.

The FIG. 4 system is suited for 10 station service. In the example, the FIG. 4 system receives and decodes incoming DTMF signals as described with reference to FIG. 1, except that the detector is programmed to provide output data in binary form, along with a positive going strobe pulse. The illustrated four binary outputs labelled 8, 4, 2 represent, by appropriate combination, five pairs of decimal digit output signals, each pair composed of one odd and one even digit. Binary output 1 represents whether the particular digit of that pair is odd or even. (Parts corresponding to those already illustrated and described herein are designated with the same reference numerals, double primed).

The 8, 4 and 2 binary data outputs are routed to a 1-of-5 decoder 66 which energizes one of five output drivers 68 in the form of suitable switching transistors, depending upon which decimal digit pair is indicated by the binary output data at the 8, 4 and/or 2 detector outputs. The output drivers respectively drive or control five output relays 70. Each output relay has two sets of contacts, one set associated with an odd digit output and the other set associated with an even digit output. An odd-even relay 72 individually assesses two output buses which determine which set of contacts (odd or even) are operated in accordance with the binary data at detector output 1.

Figure 5:
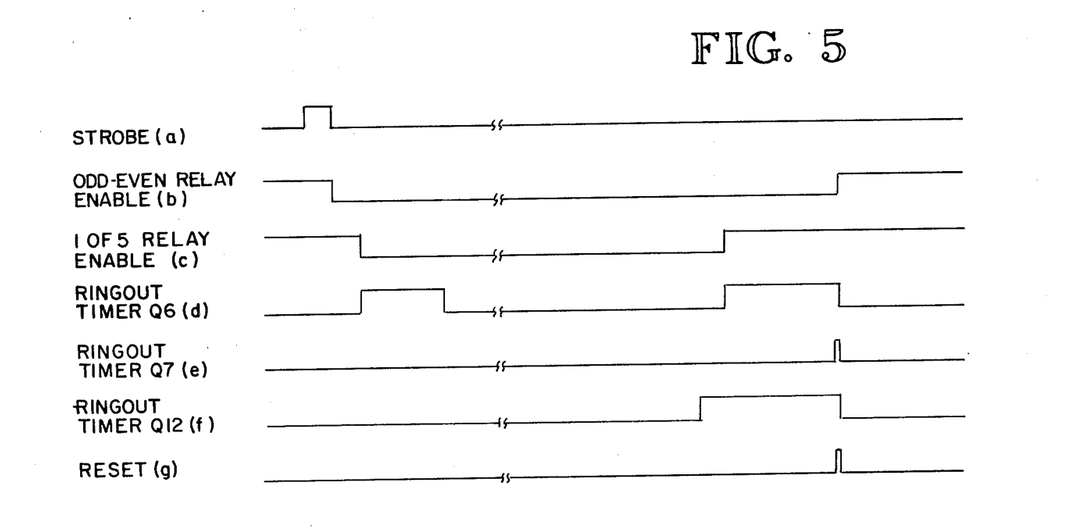
FIG. 5 is a timing diagram depicting operation of the FIG. 4 system.

To prevent false ring-outs, the odd-even relay is operated before the designated 1-of-5 output relay at initiation of ring-out (or contact make). To this end, an odd-even control flip flop 74 generates a logic 0 signal (FIG. 5, curve b) which is applied to and enables an odd-even driver 76 associated with the odd-even relay upon receipt of the strobe pulse. The FIG. 5, curve b, signal also is applied to and hence removes the reset signal from the reset input of the ring-out timer 56" in order to enable it to begin counting in accordance with clock pulses generated by detector 32". This signal additionally is routed via gate 38" to the not inhibit input of the detector, to the detector outhold input, and to the set input of a 1-of-5 relay control flip flop 78. Once enabled, the ring-out timer begins counting and, after a predetermined time period, presents a logic 1 signal at its Q6 output, as shown (FIG. 5, curve d). This signal is delivered to the clock input of the flip flop 78 which thereupon presents a logic 0 output signal which is applied to and enables the decoder 66 and therefore drivers 68 and relays 70. The odd-even relay therefore is enabled by flip flop 74 prior to the time that the 1-of-5 relays are enabled by flip flop 78 in accordance with the timing sequence of the ring-out timer.

At the end of ring-out, this process is repeated in reverse sequence so that the 1-of-5 relays are disenabled before the odd-even relay. The Q12 output of the timer first assumes a logic 1 state which is applied to the data input of flip flop 78. (The Q12 output also is routed to reset 60" for reset purposes). The Q6 output of the timer assumes a logic 1 output a predetermined time later, as shown (FIG. 5, curves d, f). This causes the flip flop 78 to revert to a logic 1 output state and, in so doing, to disenable the decoder 66, drivers 66 relays 70 by operation of pull down resistors 80. The Q7 output of the ring-out timer thereafter assumes a logic 1 state while the Q12 output thereof remains at logic 1, as shown (FIG. 5, curves f, g). The occurance of simultaneous logic 1 output signals at Q7 and Q12 causes a reset signal to be routed via the reset circuit 60" to the reset input of flip flop 74 which thereupon causes the odd-even driver 76 and hence relay 72 to be disenabled. The odd-even relay, of course, may not be operated in some instances, depending upon whether the digit dialed is odd or even.

Although several preferred embodiments of the invention have been illustrated and described herein, variations will become apparent to one of ordinary skill in the art. Accordingly, the invention is not to be limited to the specific embodiments illustrated and described herein, and the true scope and spirit of the invention are to be determined by reference to the appended claims.

The embodiments of the invention in which an exclusive property or priviledge is claimed are defined as follows:

1. A tone selective key telephone communication system, comprising: decoder means including digital multi-frequency tone detector means for decoding station address information in the form of frequency coded tone signals transmitted from a calling station; and access means operatively associated with said detector means for causing a called station having a station address corresponding to the decoded station address to be accessed in order to produce a call indication thereat, said access means including means for controlling operation of said tone detector means during call indication.

2. The system of claim 1, wherein said access means are further operative for controlling operation of said tone detector means by enabling said tone detector means during call indication, and causing said tone detector means to hold a decoded station address output signal during call indication.

3. The system of claim 1, wherein said decoder means include means for separating incoming frequency coded tone signals transmitted from a calling station into a high frequency signal within a high frequency tone group and a low frequency signal within a low frequency tone group, and wherein said tone detector means include a source of clock pulses of frequency substantially greater than said high frequency signal, means for identifying the frequencies of the high and low frequency signals within predetermined band widths by counting said clock pulses during successive cycles of the high and low frequency signals, respectively, means for presenting a data signal based upon the high and low frequencies identified, and means for presenting a strobe signal indicative that the data signal corresponds to valid tone signals.

4. The system of claim 3, wherein said decoder means further include level detector means for detecting the level of the incoming high frequency signal and initializing said detector means on the basis of the occurrence of silence represented by incoming signal level below a predetermined level.

5. The system of claim 4, wherein said access means include transfer relay means for selectively routing a call indication signal to one group of stations within multiple station groups, digit relay means for selectively routing the call indication signal to the called station within said one group, transfer digit decode logic means for receiving said data signal and determing whether it corresponds to a transfer digit or a non-transfer digit, transfer relay control means for controlling said transfer relay means, transfer enable means responsive to said strobe signal for enabling said transfer relay control means when said transfer digit decode logic means determine that said data signal corresponds to a transfer digit, digit relay control means for receiving said data signal and controlling said digit relay means, call indication timer means driven by said clock pulse source for timing the call indication, call indication enable means responsive to said strobe signal for enabling said call indication timer means and said digit relay control means when said transfer digit decode logic means determine that the data signal corresponds to a non-transfer digit, reset means operatively associated with said call indication timer means for initializing said transfer enable and transfer relay control means so as to disenable said transfer relay means and for initializing said call indication enable means so as to disenable said digit relay means upon termination of a call indication.

6. The system of claim 5, wherein said call indication timer means are further operative for controlling said digit relay control means and said reset means so as to cause said digit relay means to be disenabled prior to disenablement of said transfer relay means.

7. The system of claim 5, wherein said access means still further include hook sense detector means for causing said reset means to disenable said transfer and digit relay means when all stations assume on-hook status.

8. The system of claim 5, wherein said call indication enable means are further operative for causing said tone detector means to remain enabled and hold said data signal during call indication.

9. The system of claim 5, wherein said transfer digit decode logic means further include means for identifying the transfer digit, and wherein said transfer relay means include a plurality of transfer relays for selectively accessing individual groups of digit relays constituting said digit relay means, and said transfer relay control means include means for operating said transfer relays such that said digit relay groups may be selectively accessed.

10. The system of claim 3, wherein said access means include output relay means for alternatively routing a call indication signal to respective pairs of called stations each having one odd and one even station address, output decoder means for receiving said data signal and controlling which such pair is accessed by said output relay means, odd-even relay means for controlling whether the odd or even addressed stations of each such pair are accessed, output relay enable means for enabling said output relay means, call indication timer means for timing the call indication, odd-even enable means responsive to said strobe signal for enabling (1) said output relay enable means, (2) said call indication timer means, and (3) said odd-even relay means, and reset means operatively associated with said call indication timer means for initializing said odd-even enable means so as to cause said output relay means and said odd-even relay means to be disenabled upon termination of a call indication.

11. The system of claim 10, wherein said call indication timer means are further operative for controlling said output relay enable means and said reset means so as to cause said odd-even relay means to be enabled prior to enablement of said output relay means at initiation of call indication, and to be disenabled after disenablement of said output relay means at termination of call indication.

12. The system of claim 10, wherein said access means still further include hook sense detector means for causing said reset means to disenable said output relay means and said odd-even relay means when all stations assume on-hook status.

13. The system of claim 10, wherein said odd-even enable means are further operative for causing said tone detector means to remain enabled and hold said data signal during call indication.

14. A tone selective key telephone communication system, comprising: decoder means including digital multi-frequency tone detector means for decoding station address information in the form of frequency coded tone signals transmitted from a calling station; and access means operatively associated with said detector means for causing a called station having a station address corresponding to the decoded station address to be accessed in order to produce a call indication thereat, said tone detector means including means for producing a strobe signal indicative that a tone signal is a valid tone signal, and said access means including output enable means responsive to said strobe signal for initiating a call indication.

15. The system of claim 14, wherein said output enable means are further operative for enabling said tone detector means and causing said tone detector means to hold a decoded station address output signal during call indication.

16. The system of claim 14, wherein said access means include timer means enabled by said output enable means for causing the call indication to be terminated after a predetermined time period.

17. The system of claim 16, wherein said tone detector means are further operative for producing a clock signal, and wherein said timer means include a multistage counter driven by said clock signal.

18. The system of claim 16, wherein said access means further include output relay means operatively associated with said output enable means for selectively accessing the called station when enabled by said output enable means, and reset means operatively associated with said timer means for initializing said output enable means so as to disenable said output relay means upon termination of such call indication.

19. The system of claim 18, wherein said access means still further include hook sense detector means for causing said reset means to initialize said output enable means so as to disenable said output relay means when all stations assume on-hook status.

20. The system of claim 19, further comprising means operatively associated with said hook sense detector means for indicating that the calling station is off-hook.

21. A tone selective key telephone communication system, comprising: decoder means including digital multi-frequency tone detector means for decoding station address information in the form of frequency coded tone signals transmitted from a calling station; and access means operatively associated with said detector means for causing a called station having a station address corresponding to the decoded station address to be accessed in order to produce a call indication thereat, said decoder means including level detector means for initializing said tone detector following a tone detection on the basis of the occurrence of silence represented by the presentation of an incoming tone signal below a predetermined level.

22. A tone selective key telephone communication system, comprising:
decoder means for decoding station address information in the form of frequency coded tone signals transmitted from a calling station; and
access means operatively associated with said decoder means for causing a called station having a station address corresponding to the decoded station address to be accessed in order to produce a call indication thereat;
said decoder means including means for separating incoming frequency coded tone signals transmitted from a calling station into a high frequency signal within a high frequency tone group and a low frequency signal within a low frequency tone group; a source of clock pulses of a frequency substantially greater than said high frequency signal, means for identifying the frequencies of the high and low frequency signals within predetermined band widths by counting said clock pulses during successive cycles of the high and low frequency signals, respectively, means for presenting a data signal based upon the high and low frequencies identified, means for presenting a strobe signal indicative that the data signal corresponds to valid tone signals, and level detector means for detecting the level of the incoming high frequency signal and initializing said data signal presentation means on the basis of the occurrence of silence represented by incoming signal level below a predetermined level;

said access means including transfer relay means for selectively routing a call indication signal to one group of stations within multiple station groups, digit relay means for selectively routing the call indication signal to the called station within said one group, transfer digit decode logic means for receiving said data signal and determining whether it corresponds to a transfer digit or a non-transfer digit, transfer relay control means for controlling said transfer relay means, transfer enable means responsive to said strobe signal for enabling said transfer relay control means when said transfer digit decode logic means determine that said data signal corresponds to a transfer digit, digit relay control means for receiving said data signal and controlling said digit relay means, call indication timer means driven by said clock pulse source for timing the call indication, call indication enable means responsive to said strobe signal for enabling said call indication timer means and said digit relay control means when said transfer digit decode logic means determine that the data signal corresponds to a non-transfer digit, and for causing said clock pulse source to remain enabled and said data signal presentation means to hold said data signal during call indication, reset means operatively associated with said call indication timer means for initializing said transfer enable and transfer relay control means so as to disenable said transfer relay means and for initializing said call indication enable means so as to disenable said digit relay means upon termination of a call indication, and hook sense detector means for causing said reset logic means to initialize said transfer and digit relay means when all stations assume on-hook status.

23. A tone selective key telephone communication system, comprising:

decoder means for decoding station address information in the form of frequency coded tone signals transmitted from a calling station;

and access means operatively associated with said decoder means for causing a called station having a station address corresponding to the decoded station address to be accessed in order to produce a call indication thereat;

said decoder means including means for separating incoming frequency coded tone signals transmitted from a calling station into a high frequency signal within a high frequency tone group and a low frequency signal within a low frequency tone group, a source of clock pulses of a frequency substantially greater than said high frequency signal, means for identifying the frequencies of the high and low frequency signals within predetermined band widths by counting said clock pulses during successive cycles of the high and low frequency signals, respectively, means for presenting a data signal based upon the high and low frequencies identified, means for presenting a strobe signal indicative that the data signal corresponds to valid tone signals, and level detector means for detecting the level of the incoming high frequency signal and initializing said data signal presentation means on the basis of the occurrence of silence represented by incoming signal level below a predetermined level;

said access means including output relay means for alternately routing a call indication signal to respective pairs of called stations each having one odd and one even station address, output decoder means for receiving said data signal and controlling which such pair is accessed by said output relay means, odd-even relay means for controlling whether the odd or even addressed stations of each such pair are accessed, output relay enable means for enabling said output relay means, call indication timer means for timing the call indication, odd-even enable means responsive to said strobe signal for enabling (1) said output relay enable means, (2) said call indication timer means, and (3) said odd-even relay means, and reset means operatively associated with said call indication timer means for initializing said odd-even enable means so as to cause said output relay means and said odd-even relay means to be disenabled upon termination of a call indication;

said call indication timer means being further operative for controlling said output relay enable means and said reset means so as to cause said odd-even relay means to be enabled prior to enablement of said output relay means at initiation of call indication, and to be disenabled after disenablement of said output relay means at termination of call indication.

24. A method of tone selective communication, comprising the steps of: separating incoming frequency coded tone signals transmitted from a calling station into a high frequency signal within a high frequency tone group and a low frequency signal within a low frequency tone group; identifying the frequencies of the high and low frequency signals within predetermined bandwidths by counting clock pulses of a predetermined frequency substantially greater than the high frequency signal during successive cycles of the high and low frequency signals, respectively; presenting a data signal based upon the high and low frequencies identified; presenting a strobe signal indicative that the data signal corresponds to valid tone signals; causing a called station having a station address corresponding to the station address represented by said data signal to be accessed in order to produce a call indication thereat in response to presentation of the strobe signal; controlling the duration of such call indication on the basis of the clock pulses used in said frequency identification step; repeating said frequency identification, data signal presentation, and strobe signal presentation steps with respect to such tone signals following detection of silence represented by incoming signal levels below a predetermined level; and then repeating said called station access and call indication control steps.

* * * * *